Jan. 19, 1937.  E. F. M. SPEIDEL  2,068,519
OPHTHALMIC MOUNTING
Filed Feb. 19, 1935  2 Sheets-Sheet 1
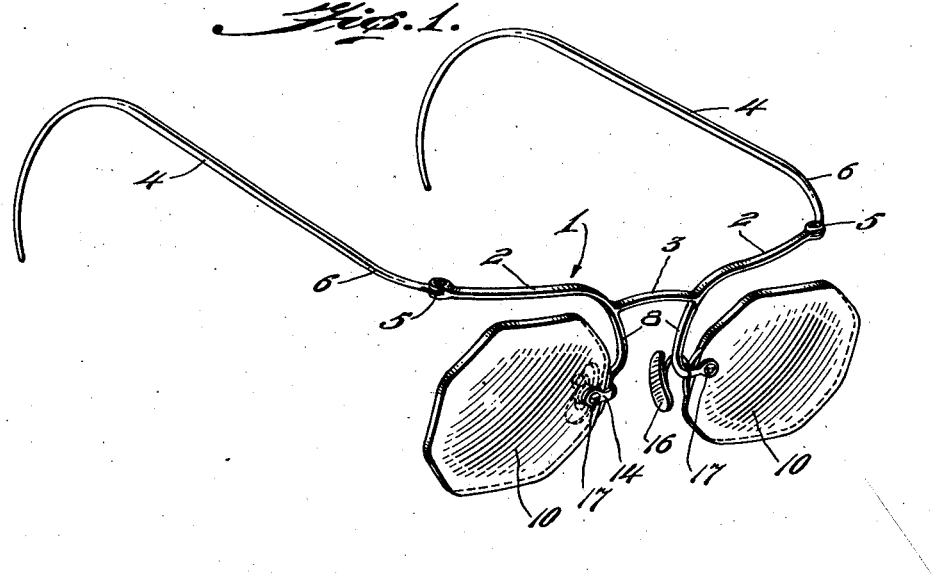
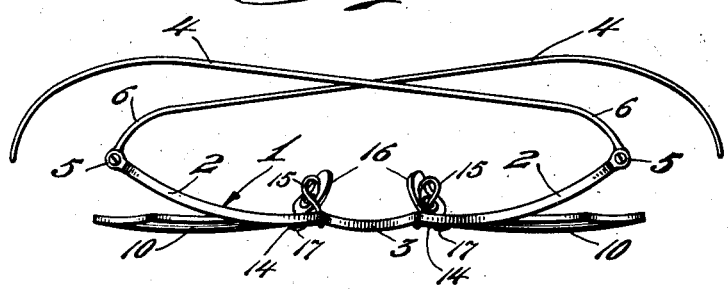
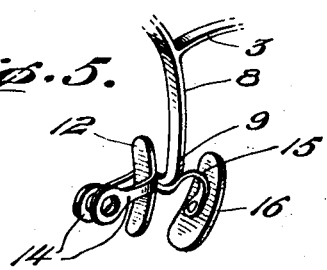
Inventor
Edwin F. M. Speidel
By Perley H. Plant.
Attorney

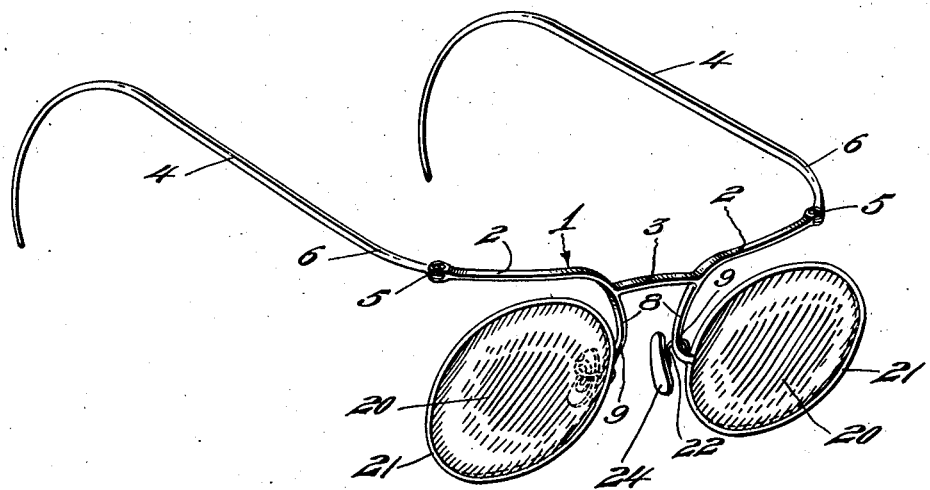
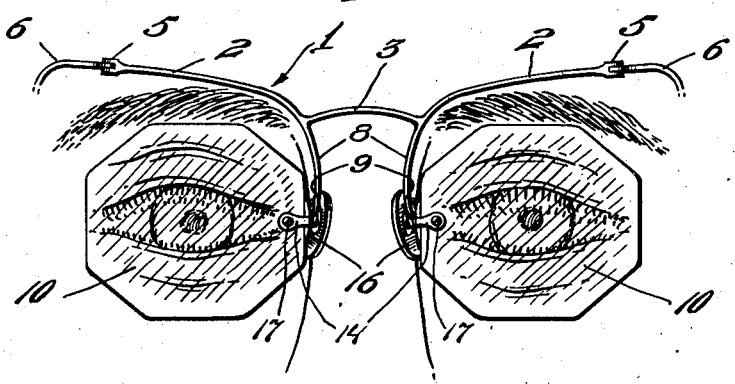

Patented Jan. 19, 1937

2,068,519

UNITED STATES PATENT OFFICE 2,068,519

OPHTHALMIC MOUNTING

Edwin F. M. Speidel, Cranston, R. I.

Application February 19, 1935, Serial No. 7,180

4 Claims. (Cl. 88—47)

This invention relates to an ophthalmic mounting adapted to provide a substantially entirely clear and unobstructed vision for the user free from shadows or objects within the field of vision cast by portions of the lens supporting members.

Various attempts have been made heretofore for providing a spectacle mounting giving a more or less unobstructed view, by so positioning the temples and other lens supporting parts of a spectacle frame that the degree of interference with a clear vision might be reduced somewhat. None of the various devices and structures formed for this purpose has been entirely successful in accomplishing the desired end, for while the positions of the obstructing parts have been so changed as to provide devices wherein the degree of interference was minimized, none of these structures has succeeded in eliminating such interference with any substantial degree of completeness.

One object of the present invention is to provide a construction of this character which substantially entirely eliminates from view those parts of the mounting which support the lenses, and so positioning those parts which are incapable of being eliminated entirely from the field of vision that they are located against a background provided by a portion of the face which prevents them from standing out within the normal field of vision to obscure or distort the view.

Another object of the invention is the provision of a mounting of this character wherein the main portions of the supporting frame are positioned entirely without the field of vision, they being preferably supported above the eyes but spaced slightly from the forehead in order not to become a source of discomfort by bearing against or coming into contact with portions of the forehead.

Another object of the invention is the provision of an ophthalmic mounting wherein the main supporting frame portions are located substantially above the field of vision and the lenses themselves together with a portion of the frame are supported solely from the sides of the nose to avoid any discomfort such as is frequently occasioned by the use of a bridge member connecting the lenses and bearing directly upon a portion of the nose.

A further object of the invention is the provision in a mounting of this character of lens supporting members extending downwardly from above the field of vision and located by the side of and in such close proximity to the nose as to be viewed, if at all, substantially entirely against the background of the nose whereby they are incapable of obscuring or interfering with the appearance of objects seen by the observer within the normal field of vision.

Other objects and advantages of the invention relate to various improved details of construction and novel forms and arrangements of the parts as will be more fully set forth in the detailed description to follow.

Referring to the drawings:—

Fig. 1 is a perspective view of a spectacle frame embodying one form of the invention and illustrating the same in connection with rimless lenses of a type in common use.

Fig. 2 is a perspective view, similar to Fig. 1, of a spectacle frame embodying the invention and showing the same in connection with lenses provided with the usual rims, Fig. 3 is a top plan view of the mounting shown in Fig. 1 of the drawings, and illustrating the same in the partially folded position of the temples, Fig. 4 is a front view of the mounting showing the lenses and frame parts as located in their normal positions relative to the eyes, and, Fig. 5 is an enlarged detail perspective view of one of the lens shoes and nose guard supports showing their positions relative to one of the depending lens supporting members.

In that form of the invention shown in Figs. 1, 3, 4, and 5 of the drawings, I designates generally a frame member adapted to be positioned above the eyes of the wearer and entirely outside of the field of vision. The frame member I is shaped to conform substantially with the contour of those portions of the face across which it extends, and is preferably maintained in spaced relation with or substantially out of contact with the face throughout its extent. The frame member I may comprise end sections 2 and a central section 3, which may be of integral construction or firmly united together to form the frame member. The end sections 2 are each inclined rearwardly, or towards the back of the head, throughout that portion of its extent which is most remote from the central section 3, to conform more closely with the contour of the face, the degree of rearward inclination being dependent upon the shape of the face and the proper positioning of the temples. A temple 4 is pivotally connected to each end section, as indicated at 5, and each temple 4 is provided with an outwardly bowed or curved portion 6 adjacent to its point of pivotal connection with the end section 2 of the frame member. It is to be understood that the frame member 1 is so formed that its ends are located at points somewhat inwardly of the sides of the head and the bowed or curved portions 6 of the temples serve to position the rearwardly extending portions of the temples suitably to engage the sides of the head when the temples 4 are turned on their pivots 5 to the limit of their outward movement. By locating the pivots 5 substantially at the points indicated and providing the bowed or curved portions 6 of the temples the mounting is adapted for fitting substantially the contour of the head and at the same time a structure is provided which permits the folding of the parts into a relatively narrow space, as is indicated in Fig. 3 of the drawings, since the total curvature is divided between the frame 1 and temples 4 to permit a closer folding of the parts than would be otherwise possible.

Lens supporting members 8 extend downwardly from the frame 1 in spaced relation with each other preferably from points at or adjacent to the points of connection of the end sections 2 with the central section 3. The lens supporting members 8 are separate from each other throughout their extent, and each of said members is preferably so positioned relative to its point of departure from the frame member and so shaped as to follow substantially the contour of and be maintained in substantial spaced relation with a part of the nose throughout the greater portion of its extent, whereby it may be positioned substantially entirely outside of the clear vision field, that is, without the field of unobstructed view, so that if capable of being seen at all it is outlined against the surface of the nose since it lies for the most part inwardly of the bridge of the nose. This form and arrangement of the lens supporting members serves to prevent them from being outlined against or interfering with objects which may be seen by one eye as viewed across the bridge of the nose. Each lens supporting member 8 may be formed integral with or rigidly united to one of the end sections 2 or the central section 3 to form with the frame member 1 a firm supporting structure for the lenses.

The extreme lower end portion 9 of each lens supporting member 8 may be offset from the nose to such a degree as to be suitably located for supporting a lens 10 in proper position relative to the eye, and may be formed integral with or firmly united to a lens shoe 12 provided with the usual spaced clamping members 14 for attachment to a lens. A nose guard support 15 may be formed integral with or firmly united to either the lens supporting member 8 or a portion of the shoe 12, and may extend inwardly towards the side of the nose from the lower end portion 9 of the lens supporting member and carry a nose guard 16 suitably positioned for engagement with one side of the nose to locate properly the lens 10 in appropriate optical relation to the eye. A screw 17, or any other suitable means, may be employed for securing each lens 10 between the spaced clamping members 14, as is usual in devices of this character.

In that form of the invention shown in Fig. 2 of the drawings, the frame member, temples and depending lens supporting members are all substantially identical with the corresponding parts previously described and are designated by like reference characters.

In this form of the structure, however, there are employed lenses 20, each of which is provided with a rim 21 of any suitable character, with which the lower end 9 of the lens supporting member 8 may be integrally united or securely attached in any suitable or desired manner. Each nose guard support 22 may be formed integral with or otherwise firmly united with the lower end portion 9 of one of the lens supporting members 8, and may carry a nose guard 24 suitably positioned for supported engagement by one side of the nose so as to locate a lens 20 in the desired relation with the eye.

In each form of the invention shown the depending lens supporting members 8 are separate from each other throughout their extent downwardly from the frame member, and each is supported entirely by its corresponding nose guard contacting with the side of the nose, thus eliminating the usual bridge member extending over and resting upon the bridge of the nose, thereby serving to position the lower portions of the lens supporting members inwardly of and/or below the bridge of the nose where they are located outside the field of clear vision so as not to enter substantially within that part of the field of view wherein an object as seen by one eye is viewed in close proximity with the bridge of the nose.

The frame member 1 and depending lens supporting members 8 are preferably formed of a relatively narrow and thin construction throughout to present the appearance generally desired in devices of this character of lightness of the frame parts.

Mention has been made of the frame member 1 and temples 4 as being located entirely beyond or without the field of vision. By this statement it is intended to define these parts as being located completely and entirely without the field of vision so as to be normally incapable of being seen by the wearer either directly or as elements appearing as shadowy images within the outer areas of the field of vision, where they might serve to distort or render confused the appearance of an object vaguely discerned within that field. Reference has also been made to the depending lens supporting members as being so positioned as to be seen, if at all, throughout the major portion of their extent as outlined against a portion of the nose, and therefore as being located out of the clear vision field. This and similar statements which may be found in the specification and the claims are intended to indicate that while portions of the depending lens supporting members 8 may be so positioned as to be seen as lying within that area of the field of vision in which objects are discerned only vaguely and imperfectly, the major portions of these parts are seen within that field as outlined against a portion of the nose, and these parts are seen as located outwardly of the real clear vision field and within that area where objects are seen only vaguely and are incapable of being observed with precision.

What I claim is:—

1. In an ophthalmic mounting, a frame member located entirely above the field of vision and shaped to conform substantially with and normally spaced from the forehead above the level of the eyes, temples pivotally connected to said frame member adjacent the ends thereof and each bowed outwardly throughout a portion of its extent at a point adjacent to its point of pivotal connection with the frame, and separate means carried by said frame member and each extending downwardly therefrom adjacent to one side of the nose for supporting a lens member in suitable optical relation with one of the eyes.

2. In an opthalmic mounting, a frame member shaped to conform substantially with the contour of the face above the eyes and adapted to be located above the eyes and entirely without the field of vision, temples pivotally connected to opposite ends of said frame member, separate lens supporting members depending from said frame member in spaced relation with each other from points adjacent to but upon opposite sides of the longitudinal center of the frame member and having the major portions thereof located substantially entirely without the clear vision field, means carried by each of said lens supporting members for supporting engagement with the nose solely upon the sides of the nose and rearwardly of the bridge of the nose, and means carried by each of said lens supporting members and located adjacent to the lower extremity thereof for clamping engagement with a lens to support the same in downwardly spaced relation with said frame member.

3. In an opthalmic mounting, a pair of lenses, a frame member having a relatively short central longitudinal portion thereof located substantially within the plane of the lenses and opposite end portions extending outwardly from each end of the central portion, each end portion being inclined rearwardly throughout a part of its extent from the plane of the lenses, lens supporting members carried by said frame member and each extending downwardly from a point adjacent to the inner end of each end portion of the frame member and each curved outwardly laterally throughout a portion of its extent for supporting a lens from the lower laterally outturned end thereof in outwardly spaced relation with one side of the nose and in downwardly spaced relation with said frame member.

4. In an ophthalmic mounting, a continuous longitudinal frame member extending across the face above the eyes, temples pivotally connected to said frame member adjacent to the opposite ends thereof, separate lens carrying members, each curved throughout the major portion of its extent, depending from said frame member and located adjacent to and upon opposite sides of the central portion thereof with their concave faces opening outwardly from a vertical line through the center of said frame member, and each having its lower end portion in substantial vertical alignment with its point of attachment to said frame member, and a lens clamping means carried by the lower end portion of each of said lens carrying members for connection with the nasal edge portion of a lens to support the lens in downwardly spaced relation with said frame member and outwardly from a vertical line passed through the center of said frame member.

EDWIN F. M. SPEIDEL.